(12) United States Patent
Ishikawa et al.

(10) Patent No.: US 6,346,756 B1
(45) Date of Patent: Feb. 12, 2002

(54) MOTOR ROTATION DETECTION STRUCTURE

(75) Inventors: Katsuhiko Ishikawa; Hiroshi Mori, both of Kiryu (JP)

(73) Assignee: Mitsuba Corporation, Gunma (JP)

( * ) Notice: Subject to any disclaimer, the term of this patent is extended or adjusted under 35 U.S.C. 154(b) by 0 days.

(21) Appl. No.: 09/669,600

(22) Filed: Sep. 26, 2000

(30) Foreign Application Priority Data

Sep. 27, 1999 (JP) .......................................... 11-272821

(51) Int. Cl.[7] .............................................. H02K 11/00
(52) U.S. Cl. ..................... 310/68 B; 310/198; 310/188; 310/224; 318/709; 318/716
(58) Field of Search ................................ 310/68 B, 179, 310/195, 198–207, 220–225, 188; 318/709, 713, 716–718, 720, 724

(56) References Cited

U.S. PATENT DOCUMENTS

| | | | | |
|---|---|---|---|---|
| 2,477,951 A | * | 8/1949 | Baumann | 171/252 |
| 2,529,526 A | * | 11/1950 | Weathers | 318/244 |
| 2,714,174 A | * | 7/1955 | Applegate | 310/265 |
| 3,239,703 A | * | 3/1966 | Long et al. | 310/183 |
| 3,506,864 A | * | 4/1970 | Miller | 310/234 |
| 3,535,573 A | * | 10/1970 | Appleton et al. | 310/177 |
| 3,733,506 A | * | 5/1973 | Jaffe et al. | 310/189 |
| 4,197,475 A | * | 4/1980 | Ban et al. | 310/203 |
| 4,270,065 A | * | 5/1981 | Major | 310/207 |
| 4,420,712 A | * | 12/1983 | Belikov et al. | 318/41 |
| 5,994,812 A | * | 10/1999 | Muszynski | 310/180 |

FOREIGN PATENT DOCUMENTS

| | | |
|---|---|---|
| JP | 8-126239 A | 5/1996 |
| JP | 10-248854 A | 10/1998 |

* cited by examiner

Primary Examiner—Nestor Ramirez
Assistant Examiner—Thanh Lam
(74) Attorney, Agent, or Firm—McCormick, Paulding & Huber LLP

(57) ABSTRACT

In a ripple voltage detection system of a rectified waveform, a motor rotation detection structure is provided to increase ripple voltage by modifying number of windings, to bring cogging torque and number of parts to be equivalent, and to achieve automatic operation function.

In the motor rotation detection structure used for automatic operation function of switching device such as vehicle power windows or the like, rotor of this motor includes an armature core with a plurality of slots arranged between teeth, a plurality of coils wound around each of the slots, a commutator with a plurality of segments connected to each of the coils and the like. Winding number of each of the coils is modified per each of the slots, and potential difference between the segments adjoining to each other and having different winding number is increased. So, the ripple voltage generated at a rotation of the armature core is increased in comparison with the segments having the same winding number.

2 Claims, 3 Drawing Sheets

○ : 14t coil group
● : 11t coil group

MOTOR ROTATION DETECTION STRUCTURE

BACKGROUND OF THE INVENTION

The present invention relates to a motor rotation detection technique used for automatic operation functions of switching devices, and particularly, to a technique which is effective for applying to a motor rotation detection structure suited for a ripple voltage detection system with a rectified waveform while an armature core is in rotation.

As techniques examined by the present inventor, examples of automatic operation functions of switching device such as power windows for vehicles, or the like include a lock current detection system, a slip ring system or the like. The lock current detection system detects upward current values caused by stopping of the motor. The slip ring system detects repeating pulses by rotating a rotating member in which conductive section and non-conductive sections are alternately arranged. However, the lock current detection system has a limitation to a lock bound current value, and the slip ring system has a problem of increase of number of parts.

In addition to these, there is a ripple voltage detection system for reading signals with a controller connected to the motor and for detecting a ripple voltage of the rectified waveform with this signal rectified. The ripple voltage detection system determines that the motor is locked if the ripple voltage exceeding a certain voltage range is not generated during a certain period, and turns off current flowing the motor.

Now, a conventional motor is able to meet the ripple voltage detection system detecting the rectified waveform. But, since number of slots of the armature core is increased to lower cogging torque, potential difference between commutator segments becomes small and the ripple voltage also is decreased (FIG. 4). This results in detecting no ripple voltage and causing a problem that the automatic operation does not function. In this conventional motor, the number of windings for each slot thereof is same.

In addition, as a winding technique of coil wound around the armature core, for example, techniques recited in Japanese Patent Application Laid-Open Publication Nos. 10-285854 and 8-126239 are mentioned. The technique of the former Publication (No. 10-285854) is one that the coil is wrapped in the number of (N+n) for the beginning and (N−n) for the ending relative to the predetermined number N of winds in order to prevent becoming fat shape as a result of characteristic modification. The technique of the latter Publication (No. 8-126239) is one that the slot profile in accord with the number of winds is modified in order to modify the characteristics without changing coil shape. Consequently, each technique of the foregoing Publications is unable to apply to the ripple voltage detection system, and is not a technique that takes into account the ripple voltage unlike the present invention.

SUMMARY OF THE INVENTION

Accordingly, an objection of the present invention is to provide a motor rotation detection structure that can achieve the automatic operation function by using the ripple voltage detection system with the above-mentioned rectified waveform. That is, by keeping eyes on the number of windings per slot of the armature core that has influence on the ripple voltage, since the ripple voltage is increased by modifying this number of windings, and the cogging torque and the number of parts are brought to be equivalent, the automatic operation function is achieved.

The present invention applies to the motor rotation detection structure comprising an armature core with a plurality of slots, aplurality of coils wound around respective slots, and a commutator with a plurality of segments connected with respective coils. And, the present invention has the following features.

That is, the motor rotation detection structure according to the present invention is characterized in that the structure has a means to detect the ripple voltage. The means is one that the number of windings of respective coils wound around respective slots of armature core is modified per respective slots, and that the potential difference between a segment and other segments adjacent thereto of the commutator is made larger in order to detect the ripple voltage of rectified waveform when the armature core is rotated. This allows the ripple voltage to be increased and the cogging torque to be made equivalent to the number of parts, relative to the automatic operation function in the ripple voltage detection system.

In this configuration, to solve the problem of difficulty to achieve characteristic matching due to the increase of number of slots, the number of winds of respective coils wound around respective slots and the total winds of all coils are subtly adjusted so as to increase the number of slots of the armature core. This results in facilitating the achievement of characteristic matching.

DESCRIPTION OF THE PREFERRED EMBODIMENTS

Figure 1:
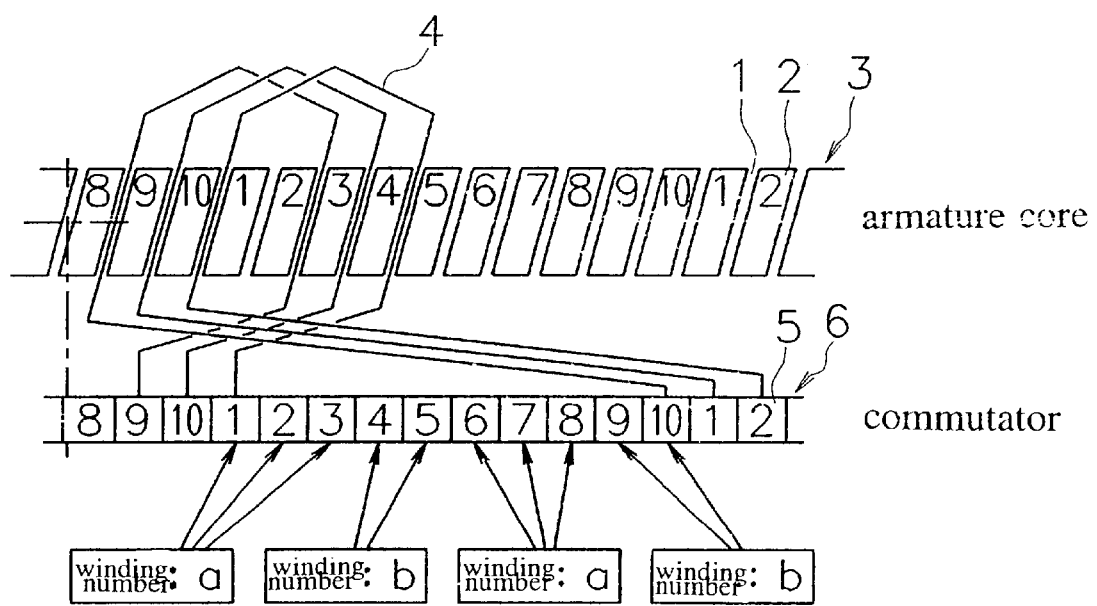
FIG. 1 is a simplified development view showing how to wind coils in a motor rotation detection structure that is one embodiment of the present invention.
Figure 2:
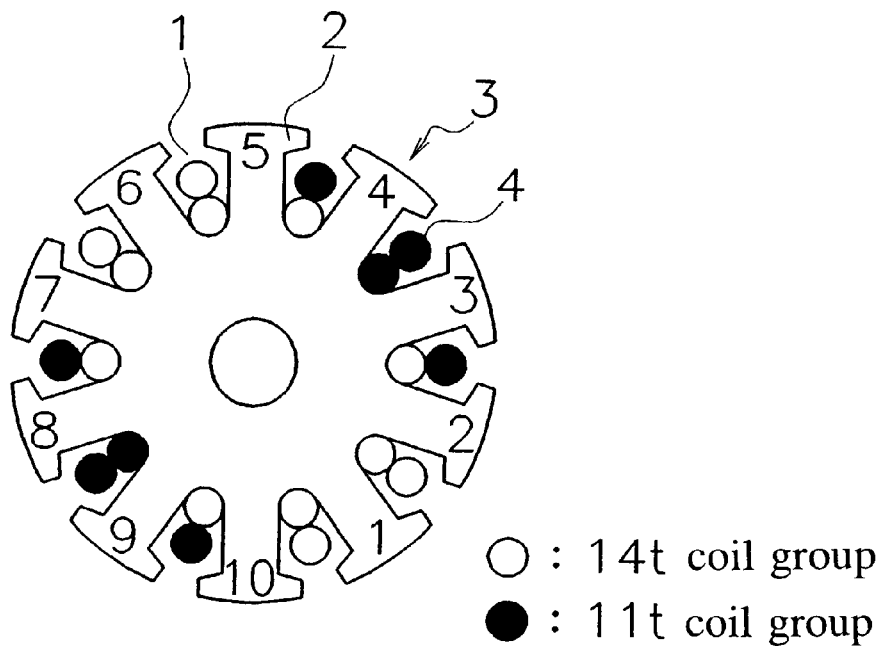
FIG. 2 is a simplified view showing an armature core winded with the coils relative to one embodiment of the present invention.
Figure 3:
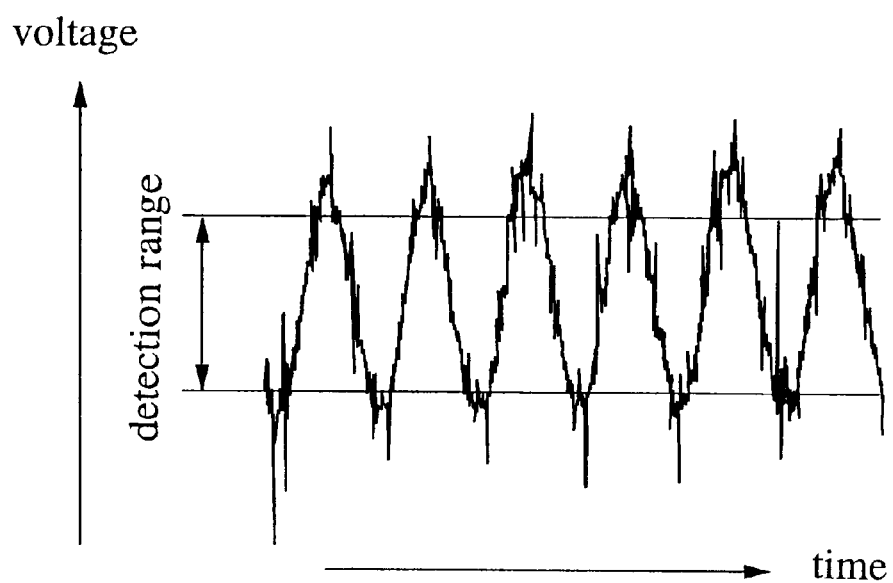
FIG. 3 is a waveform diagram showing a waveform of ripple voltage relative to the ripple voltage detection system with rectified waveform, which is one embodiment of the present invention.

On the basis of drawings, embodiments of the present invention will be described further in detail below. FIG. 1 is a simplified development view showing how to wind coils relative to the motor rotation detection structure that is one embodiment of the present invention. FIG. 2 is a simplified view showing an armature core winded with the coils. And FIG. 3 is a waveform diagram showing a waveform of ripple voltage relative to the ripple voltage detection system with the rectified waveform.

First of all, referring to FIG. 1, one example of method of winding coils relative to the motor rotation detection structure that is an embodiment will be described.

A motor of the present embodiment is used, for example, for automatic operating functions of switching devices such as power windows of vehicles or the like. And, the motor comprises a stator, a rotor, a brush, and the like, which are not shown in FIGS. 1 to 3. The stator has permanent magnet or the like arranged for inducing magnetic flux necessary to generate rotating force. The rotor is winded with armature coils which are arranged rotatably therein relative to the stator and which current necessary for generating rotary power flows in. The brush conducts the current supplied from the power source to the armature coil of the rotor.

A controller not shown is connected to this motor and controls the rotor rotation. In particular, in a case where this motor is made to function as automatic operation of the switching device such as power windows like the present embodiment, a ripple voltage detection system is used to form a motor rotation detection structure. The ripple voltage detection system is one that the controller is read a signal, this signal is rectified, and the ripple voltage of the rectified waveform signal is detected from the rectified signal.

As shown in FIG. 1, the rotor of the motor includes an armature core 3, a plurality of coils 4, a commutator 6, and the like. The armature core 3 has a plurality of slots 1 and teeth 2. Respective slots 2 are arranged between the teeth 2. Each of the slots 1 is wound with the coils 4. The commutator 5 has a plurality of segments 5 to which the coils are connected respectively. A brush is arranged so as to be able to contact electrically the commutator 6 of the rotor. When a current flows from respective segments 5 of the commutator 6 contacted by the brush, to respective coils, the rotor get rotary force due to magnetic flux induced by the permanent magnet of the stator.

In particular, regarding this rotor, the number of windings of respective coils 4 wound around each of the slots 1 of the armature core 3 is modified per each of the slots 1, and the potential difference between the segments 5 adjoining to each other in the commutator 6 is increased. For example, in FIG. 1, winding number a out of the coils 4 is wound around first (1), second (2), third (3), sixth (6), seventh (7), and eighth segment (8) of the segments 5 of the commutator 6. On the other hand, winding number b out of the coils 4 is wound around fourth (4), fifth (5), ninth (9), and tenth segment (10) of the segments 5. Note that FIG. 1 shows that the segments 5 of the commutator 6 is an example of the first (1) to tenth segment (10), is plainly drawn to understand easily, and shows some of the coils 4 so as to have each of the first (1), ninth (9), and tenth segment (10) as a starting point. Accordingly, portions having the same reference numbers are equal to each other. In practice, the coils 4 are wound around each of the first (1) to tenth segment (10) of the segments 5. Hereinafter, the first (1) to the tenth segment (10) is simply described as (1) through (10).

For example, with respect to the winding method of coils 4, in a case of starting from a segment 5(1) of the commutator 6, the coils 4 begin to be wound around the segment 5(1) and finish the winding at a segment 5(2). The coils 4 between the segments 5(1) and 5(2) are repeatedly wound around both slots 1 between teeth 2(4) and 2(5) of the armature core 3, and between teeth 2(10) and 2(1) by the winding number a. In the same manner, segments 5(2) and 5(3) of the commutator 6 are also wound with the coils 4. That is, the coils 4, which begin to be wound around the segment 5(2), are repeatedly wound around both slots 1 between teeth 2(5) and 2(6) and between teeth 2(1) and 2(2) by the winding number a, and finish the winding at a segment 5(3). And, the coils 4, which begin to be wound around the segment 5(3), are repeatedly wound around both slots 1 between teeth 2(6) and 2(7) and between teeth 2(2) and 2(3) by the winding number a, and finish the winding at a segment 5(4).

And, the segments 5(4) and 5(5) of the commutator 6 differ from the segments 5(1) through 5(3) in a winding number. The coils 4, which begin to be wound around the segment 5(4), are wound around both slots 1 between teeth 2(7) and 2(8) and between teeth 2(3) and 2(4) by the winding number b, and finish the winding at the segment 5(5). The coils 4, which begin to be wound around the segment 5(5), are wound around both slots 1 between teeth 2(8) and 2(9) and between teeth 2(4) and 2(5) by the winding number b, and finish the winding at a segment 5(6).

Furthermore, segments 5(6) through 5(8) of the commutator 6 are the same as the above-mentioned segments 5(1) through 5(3) in the winding number a. The coils 4, which begin to be wound around the segment 5(6), are wound around both slots 1 between teeth 2(9) and 2(10) and between teeth 2(5) and 2(6) by the winding number a, and finish the winding at the segment 5(7). The coils 4, which begin to be wound around the segment 5(7), are wound around both slots 1 between teeth 2(10) and 2(1) and between teeth 2(6) and 2(7) by the winding number a, and finish the winding at the segment 5(8). The coils, 4 which begin to be wound around the segment 5(8), are wound around both slots 1 between teeth 2(1) and 2(2) and between teeth 2(7) and 2(8) by the winding number a, and finish the winding at the segment 5(9).

And, segments 5(9) and 5(10) of the commutator 6 is the same as the above-mentioned segments 5(4) and 5(5) in the winding number b. The coils 4, which begin to be wound around the segment 5(9), are wound around both slots 1 between teeth 2(2) and 2(3) and between teeth 2(8) and 2(9) by the winding number b, and finish the winding at the segment 5(10). The coils 4, which begin to be wound around the segment 5(10), are wound around both slots 1 between teeth 2(3) and 2(4) and between teeth 2(9) and 2(10) by the winding number b, and finish the winding at the segment 5(1).

Therefore, regarding the segments adjoining to each other, potential difference between segments 5(1) and 5(2), 5(2) and 5(3), 5(6) and 5(7), and 5(7) and 5(8) is equal to each other because the segments 5(1) to 5(3) and 5(6) to 5(8) are wound with the same winding number a respectively. And, potential difference between segments 5(4) and 5(5), and 5(9) and 5(10) is also equal to each other because the segments 5(4), 5(5), 5(9) and 5(10) are wound with the same winding number b respectively. As a result, in comparison with the potential difference between segments wound with the same winding number, potential difference between segment 5(3) wound with the winding number a and segment 5(4) wound with the winding number b, segment 5(5) with b and segment 5(6) with a, segment 5(8) with a and segment 5(9) with b, and segment 5(10) with b and segment 5(1) with a is increased respectively.

For example, FIG. 2 shows a method of overlapping and winding coils by using a double flyer and is a simplified view a state of winding all of the coils 4 by this method in a case where a constant winding number is 14t (turn) and/or 11t. A coil group containing both 14t and 14t is wound around the slots 1 between teeth 2(1) and 2(2) of the armature core 3. A coil group containing both 14t and 11t is wound around the slots 1 between teeth 2(2) and 2(3). A coil group containing both 11t and 11t is wound around the slots 1 between teeth 2(3) and 2(4). A coil group containing both 14t and 11t is wound around the slots 1 between teeth 2(4) and 2(5). A coil group containing both 14t and 14t is wound around the slots 1 between teeth 2(5) and 2(6). A coil group containing both 14t and 14t is wound around the slots 1 between teeth 2(6) and 2(7). A coil group containing both 14t and 1lt is wound around the slots 1 between teeth 2(7) and 2(8). A coil group containing both 1lt and 1lt is wound around the slots 1 between teeth 2(8) and 2(9) A coil group containing both 14t and 1it is wound around the slots 1 between teeth 2(9) and 2(10). A coil group containing both 14t and 14t is wound around the slots 1 between teeth 2(10) and 2(1).

Figure 4:
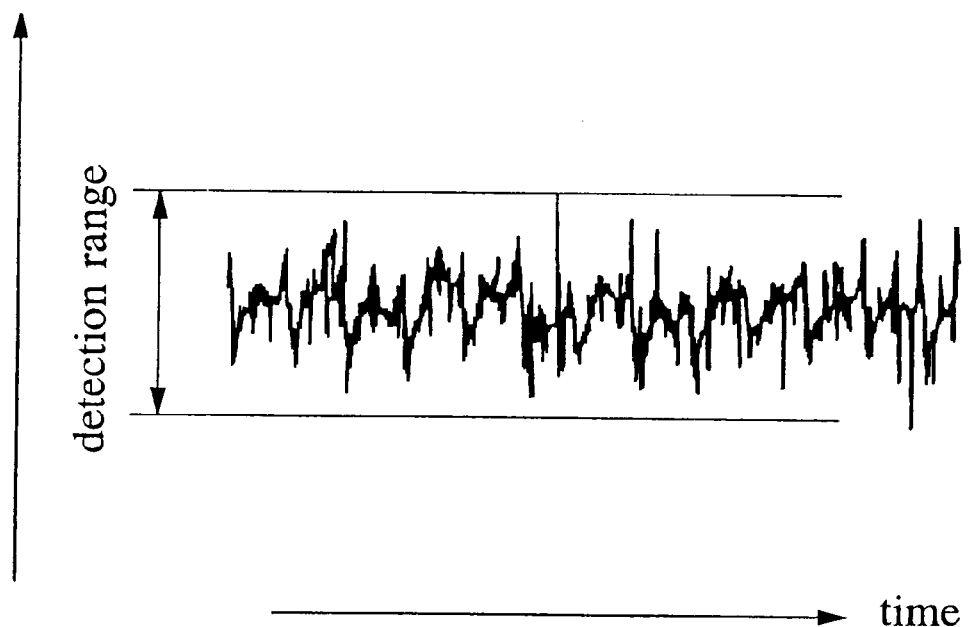
FIG. 4 is a waveform diagram showing a waveform of ripple voltage relative to the ripple voltage detection system with rectified waveform relative to a motor rotation detection structure which serves as a presupposition of the present invention.

In the method of winding the coils 4 around respective slots 1 of the armature core 3 as described above, the winding number per each of the slots I of the armature core 3 is modified. So, the potential difference between segments 5(3) and 5(4) {5(8) and 5(9)}, and 5(5) and 5(6) {5(10) and 5(1)} which adjoin to each other and have the different winding number a and b alternately is increased. Consequently, in the ripple voltage detection system detecting ripple voltage of the rectified waveform of the signal read by the controller, the ripple voltage at the rotating armature coil 3 is, for example, increased as shown in FIG. 3, in comparison with one in a case of the same winding number (see FIG. 4 as described above). That is, with respect to a detection range set to a predetermined voltage value in order to prevent mistakenly detecting noises or the like, the ripple voltage can be generated higher than this detection range and/or lower than this detection range.

Consequently, in the present embodiment, by means of using the rotation detection structure of the motor using a ripple voltage detection system of rectified waveform, the winding number per respective slots 1 of the armature core 3 is modified and the potential difference between the segments 5 adjoining to each other in the commutator 6 is increased. This results in being able to increase the ripple voltage on a state that the cogging torque and the number of parts are maintained to the equivalent level. Thereby, the automatic operation function detecting this ripple voltage can be achieved.

It is to be understood that the present invention is not limited to the above-mentioned embodiment and various embodiments of this invention may be made without departing from the spirit and scope thereof.

For example, the segments of the commutator have been described in example of the reference numbers (1) through (10), but the present invention is also applicable to cases in which number of slots is increased to reduce the cogging torque and number of segments is increased more than 11. When the umber of slots is increased in this way, for example, if the constant winding number 10t is overlapped and wound, one slot is wound with 20t. That is, in a case of using ten slots, the winding number amounts to 200t. When the winding number per one slot is increased or decreased with this kind of motor set as a base, if one slot is wound with 19t, the winding number amounts to 190t. And/Or, if one slot is wound with 21t, the winding number amounts to 210t. Difference between above-mentioned cases is 20t.

However, when twelve slots are used to reduce the cogging torque, the difference becomes as great as 24t. Accordingly, in general, as the number of slots is increased, it is difficult to achieve characteristic matching because characteristics of the cogging torque are fluctuated fiercely per the winding number 1t. On the other hand, in the present embodiment, when the winding number per one slot is modified, the number of these slots is increased, the winding number of respective coils wound around each of the slots can subtly be adjusted, and, moreover, the total winding number of all the coils can subtly be adjusted. So, it becomes easier to achieve characteristic matching even when the number of slots is increased.

Although how to wind the winding numbers 14t and 11t by utilizing the method of overlapping and winding coils by using a double flyer is described above, it is needless to say that other modifications and variations of how to wind the coils are also performed.

Furthermore, the present invention is not limited to the application as power windows but it can be extensively applied as automatic operation function of other switching devices such as automatic slide doors or the like.

As described above, according to the motor rotation detection structure of the present invention, in the ripple voltage detection system of rectified waveform, since the winding number of respective coils wound around each of the slots of the armature core is modified, the potential difference between the segments adjoining to each other in the commutator can be increased. This results in increasing the ripple voltage and keeping the cogging torque and number of parts to the equivalent level to achieve the automatic operation function.

Furthermore, when the number of slots of the armature core is increased, both winding number of respective coils wound around each of the slots and total winding number of all the coils can subtly be adjusted. So, it becomes easier to achieve characteristic matching even when the number of slots is increased.

What is claimed is:
1. A motor rotation detection structure comprising:
   an armature core with a plurality of slots;
   a plurality of coils wound around each of said slots; and
   a commutator with a plurality of segments connected with each of said coils wherein winding number of each of said coils wound around each of said slots of said armature core is modified per each of said slots, said structure has a means of detecting ripple voltage of rectified waveform generated at a rotation of said armature core when potential difference between said segments adjoining to each other in said commutator is increased.
2. The motor rotation detection structure recited according to claim 1 wherein when number of said slots of said armature core is increased, both winding number of each of said coils wound around each of said slots and total winding number of all of said coils are subtly adjusted.

* * * * *